July 16, 1968     F. PHILIPP     3,393,095

CYLINDRICAL BATTERY CELLS

Filed May 12, 1965

INVENTOR
FRITZ PHILIPP
BY *Stryker & Jacobson*
ATTORNEYS

United States Patent Office 3,393,095
Patented July 16, 1968

3,393,095
CYLINDRICAL BATTERY CELLS
Fritz Philipp, Hagen, Westphalia, Germany, assignor to Varta Aktiengesellschaft, Hagen, Westphalia, Germany
Filed May 12, 1965, Ser. No. 470,656
1 Claim. (Cl. 136—14)

ABSTRACT OF THE DISCLOSURE

In a cylindrical battery cell having coiled negative and positive plates with separator layers between, electrical and mechanical connections are made by welding the end caps of the cell to each layer of the respective coiled plates at numerous points along a line extending radially outward from the center of the cylindrical cell.

---

This invention relates generally to the construction of battery cells and in particular to the construction of cylindrical cells having coiled electrodes. Although in the present-day state of the technology this invention will likely find its greatest application in the construction of cylindrical, sealed, alkaline battery cells, it should be understood that the invention is not necessarily so limited.

In the past construction of cylindrical cells with coiled negative and positive plates, which are suitably separated by an insulating layer or separator, electrical connection from the plates to the external utilization device was generally made through an electrically conductive tab extending outward from an edge of the plate to an end cap or to the casing. The latter, in turn, would constitute the external electrical contact for the utilization device. Some difficulties were encountered, however. It was found that when only a single tab was used from the plate to the external connection there resulted a concentration of the current flow from the cell through the single tab which produced some harmful results in the operation of the cell. Principally, the resistance in the electrical circuit path was relatively high, not only because of the extended length of the current path which might extend, for example, from one extremity of one of the coiled plates to the other extremity where the tab was likely located, but also due to the relatively small cross-section of the tab conductor through which all of the current flows to the utilization device. To overcome this principal difficulty, there began the use of multiple tabs in the construction of battery cells of this nature. The multiple tabs are fixedly attached to and suitably spaced along the length of each of the plates and all the tabs for each are connected together and to a common point, such as the end cap, to complete the electrical connection. Although this technique did somewhat alleviate the resistivity problem of the electrical circuit, since the circuit path was thereby shortened and the effective cross-section of the tab conductor from the plate to the external contact was considerably increased, there resulted a manufacturing problem. These large numbers of tabs jutting out along the edge of each of the plates would tend to become entangled with one another and often break or be otherwise damaged by twisting when the plates were coiled during the manufacture. Furthermore, these tabs had to be attached individually to the plates or formed as an integral part thereof. All of this led to higher production costs because of the increased waste and increased production time.

It is the general object of this invention to provide a manner of construction of coiled cylindrical battery cells which achieves the low resistance circuit path as provided by the multiple tab construction without the accompanying manufacturing problems encountered heretofore.

More specifically, it is an object of this invention to provide low resistance paths between the plates of a coiled cell and their external contacts without a multitude of extending tabs attached to the plates.

Another object of this invention is to achieve the foregoing objects with a construction which lends itself to efficient and relatively inexpensive manufacturing steps.

Still another object of this invention is to achieve the desired beneficial electrical characteristics stated above in a manner which also produces good mechanical stability.

These and other objects and features will be pointed out during the course of the following detailed description with reference to the accompanying drawings in which.

Basically, the cylindrical battery cell with which the present invention is concerned is coiled in the well known manner. This may be done by starting with a flat rectangular negative plate and laying over it, in succession, flat rectangular layers of a suitable separator, a positive plate and further separator material. This multiple-layered sandwich is then spirally wound into a cylindrical construction such as represented generally by 10 in FIG. 1. The respective layers in the cylindrical cell are the negative plate 11, separator 12 and the positive plate 13. Before coiling the multiple layered structure into the cylindrical shape as described, one of the plates, say the negative 11, is moved laterally, say rightward, so that its right-hand edge extends beyond the corresponding edge of the other plate and there is a margin along the extending right-hand edge which protrudes beyond the separator layers and the corresponding edge of the positive plate. It follows, of course, that the left-hand edge of the positive plate 13 is then extending beyond its corresponding edge of the negative plate and likewise has a marginal portion all along that edge which protrudes beyond the corresponding edge of the negative plate. Of course, it is likely more convenient and efficient to initially lay the various layers over one another with these margins protruding along the one edge of each. The suggestion of laterally shifting the plates is merely to more clearly point out the relative positions. Any separator material coextensive with the protruding margins can be removed since the negative and positive plates are not overlapping one another in those regions.

Figure 1:
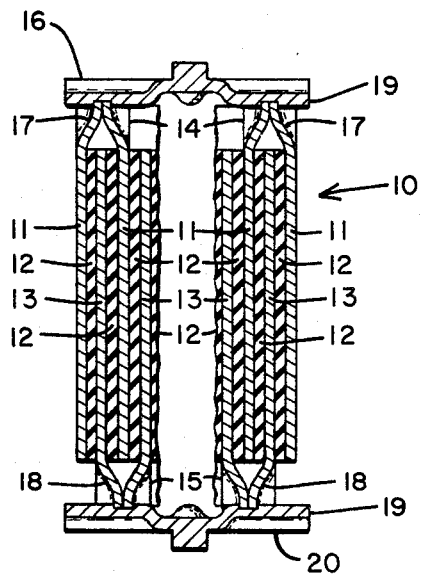
FIGURE 1 is a partial vertical section of a cylindrical battery cell standing on end which is constructed according to the teachings of this invention.

After coiling and before any further processing steps, the protruding margins of the negative plate 11 will extend straight upward, when placed on end, as shown at 14 in FIG. 1, and correspondingly the protruding margins of the positive plate 13 extend downward as shown at 15. Since these edges are extending throughout the length of the spiral winding of the plates, an end cap disk 16 can be placed over the protruding edge of the negative plate 11 and in this manner will generally be in good electrical contact with the plate all along the protruding edge. This end cap, which is made from a good electrically conductive material, then constitutes the contact through which external electrical connection is made from the negative electrode of the battery cell to the utilization device, in the well known manner. Similarly, of course, an end cap 20 is provided for the positive plate. Since the external electrical contact is continuously made throughout the entire length of the respective plates, the electrical current path between the cell and the utilization device has the very low resistance which is so highly desirable.

Figure 2:
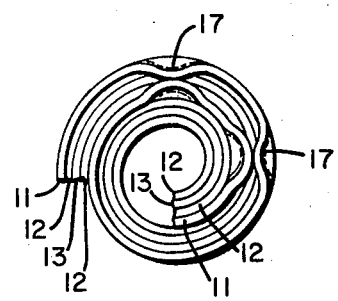
FIG. 2 is a top view of the cell constructed as illustrated in FIG. 1, with its upper end cap removed.
Figure 3:
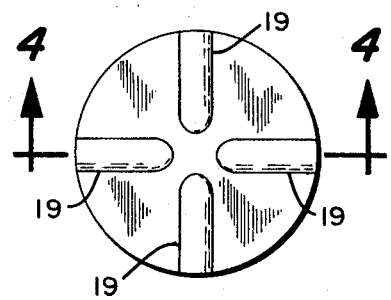
FIG. 3 illustrates the inner surface of the end caps which are used in the battery cell constructed according to the illustration in FIG. 1.
Figure 4:
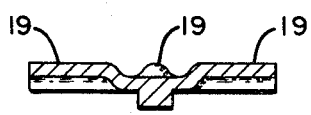
FIG. 4 is a sectional view taken along line 4—4 of FIG. 3.

It may be preferable to make the electrical contact between end caps and the respective plates in a somewhat different manner in order to ensure a mechanically stable construction as well as a good electrical connection therebetween. This may be done, for example, by connecting together the various layers of the respective plates at spaced-apart locations along their lengths as by crimping or welding or the like, such as illustrated at 17 for the negative plates and at 18 for the positive plates in FIGS. 1 and 2. As shown in FIG. 4, the inner surface of the end caps 16 and 20 can then be provided with elongated beads 19 of a suitable welding material which may be spaced regularly, say at every 90 degrees, and which extend radially inward from the outer edge of the disk. Preferably, these beads are an integral part of the end caps themselves, being formed when the end caps are stamped or machined out. The pattern of crimping or welding the layers of the respective plates, such as at 17, follows the arrangement of the welding beads 19 on the end cap. In this manner the crimped portions 17 of the negative plate 11 will be in contact with the beads 19 when the end cap 16 is put in place. By well known welding techniques, in which both the welding electrodes can be placed on the outside of the end cap 16 (sometimes known as double-spot welding), the crimped portions 17 of the plates 11 can be welded to the beads 19 thereby making solid mechanical and electrical contact at a multitude of spots to ensure mechanical stability along with the low resistance conductive path to the external electrical contact. It follows that in an identical manner the end cap 20 can be attached to the negative plate 13.

I claim:
1. In a cylindrical battery cell containing a negative and positive plate spirally wound together with a separator layer of insulating material therebetween to form a multiple-layer coiled element, the improvement comprising: a margin along one longitudinal edge of the positive plate protruding beyond the corresponding edge of the negative plate; a similar margin along the other longitudinal edge of the negative plate protruding beyond its corresponding edge of the positive plate; the protruding margins of sets of adjacent layers of the respective plates being crimped together across the gaps between said layers along radii of the coiled element; and electrically-conductive end cap discs covering the edges of the respective plates, each of said end caps containing on its underside an elongated bead of electrically-conductive weldable material extending radially outward from its center and being welded to a corresponding protruding plate edge margin at the respective crimped locations for providing mechanical and electrical connection between said end caps and the respective plates.

References Cited
UNITED STATES PATENTS

| | | | |
|---|---|---|---|
| 2,487,499 | 11/1949 | Webb | 136—13 |
| 3,023,260 | 2/1962 | Coler et al. | 136—14 |

ALLEN B. CURTIS, *Primary Examiner.*

WINSTON A. DOUGLAS, *Examiner.*

C. F. LEFEVOUR, *Assistant Examiner.*